(12) United States Patent
Macey et al.

(10) Patent No.: US 6,571,013 B1
(45) Date of Patent: *May 27, 2003

(54) AUTOMATIC METHOD FOR DEVELOPING CUSTOM ICR ENGINES

(75) Inventors: Garrett N. Macey, Rockville, MD (US); Ivan N. Bella, Gaithersburg, MD (US)

(73) Assignee: Lockhead Martin Mission Systems, Gaithersburg, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/664,221

(22) Filed: Jun. 11, 1996

(51) Int. Cl.$^7$ .................................. G06K 9/00

(52) U.S. Cl. ....................... 382/181; 382/187

(58) Field of Search ................. 382/181, 190, 382/192, 201, 209, 159, 226, 160, 161; 235/435

(56) References Cited

U.S. PATENT DOCUMENTS

| | | | | |
|---|---|---|---|---|
| 5,054,094 A | * | 10/1991 | Barski | 382/192 |
| 5,317,652 A | * | 5/1994 | Chatterjee | 382/304 |
| 5,321,773 A | * | 6/1994 | Kopec et al. | 382/159 |
| 5,526,444 A | * | 6/1996 | Kopec et al. | 382/233 |
| 5,594,809 A | * | 1/1997 | Kopec | 382/161 |

OTHER PUBLICATIONS

Mori et al., "Historical Review of OCR Research and Development", Proceedings of the IEEE, vol. 80, No. 7, 7/92, pp. 1029–1057.

Patrenahalli et al., "A Branch and Bound Algorithm for Features Subset Selection", IEEE Transactions on Computers, vol. C–26, No. 9, 9/77, pp917–922.

Okada et al., "An Optimal Orthonormal System for Discriminant Analysis", Pattern Recognition, vol. 18, No. 1, 1985, pp. 139–144.

Riccia et al., "Fisher Discriminant Analysis and Factor Analysis", IEEE Transactions on Pattern Analysis and Machine Intelligence, vol. PAMI–5, No. 1, Jan. 1993, pp. 99–104.

(List continued on next page.)

*Primary Examiner*—Samir Ahmed
(74) *Attorney, Agent, or Firm*—Venable LLP.; Andrew C. Aitken

(57) ABSTRACT

A computer automated feature selection method based upon the evaluation of hyper-rectangles and the ability of these rectangles to discriminate between classes. The boundaries of the hyper-rectangles are established upon a binary feature space where each bit indicates the relationship of a real feature value to a boundary within the minimum and maximum values for the feature across all samples. Data reduction combines the binary vector spaces so that the number of samples within a single class is within a range which is computationally feasible. Identification of subclasses identifies maximal subsets of $S^+$ which are exclusive against $S^-$. Feature evaluation determines within a single subclass the contribution of each feature towards the ability to discriminate the subclass from $S^-$. The base algorithm examines each feature, dropping any feature which does not contribute towards discrimination. A pair of statistics are generated for each remaining feature. The statistics represent a measure of how many samples from the class are within the subclass and a measure of how important each feature is to discriminating the subclass from $S^-$. The values for each subclass are then combined to generate a set of values for the class. These class feature metrics are further merged into metrics evaluating the features contribution across the entire set of classes. Feature reduction determines which features contribute the least across the entire set of classes.

18 Claims, 5 Drawing Sheets

OTHER PUBLICATIONS

Ronald et al., "Feature Induction by Backpropagation", IEEE International Conf. on Neural Networks, Jan. 1994, pp. 531–534.

Rounds et al., "A Combined Nonparametric Approach to Features Selection and Binary Decision Tree Design", Pattern Recognition, vol. 12, 1979, pp. 313–317.

Sethi et al., "Design of Multicategory Multifeature Split Decision Trees Using Perceptron Learning", Pattern Recognitiion, vol. 27, 1994, pp. 939–947.

Siddiqui et al., "Best Feature Selection Using Successive Elimination of Poor Performers", Proceedings of the Annual Conf. on Engineering in Med. & Biol., v. 15, Feb. 1993, pp. 725–726.

Solberg et al., "Automatic Feature Selection in Hyperspectral Satellite Imagery", IGARSS v 1 1993, pp. 472–475.

Sudhanva et al., "Dimensionality Reduction Using Geometric Projections: A New Technique", Pattern Recog., vol. 25 No. 8, 1992, pp. 809–817.

Wang et al., "Analysis and Design of a Decision Tree Based on Entropy Reduction and Its Application to Large Character Set Recognition", IEEE Trans. on Pattern Ana. & Mach. Intell., vol. PAMI-6, No. 4 1984, pp406–417.

Yu et al., "A More Efficient Branch and Bound Algorithm for Feature Selection", Pattern Recognition, vol. 26, No. 6, 1993, pp. 883–889.

Baim, "A Method for Attribute Selection in Inductive Learning Systems" IEEE Transactions on Pattern Analysis and Machine Intelligence, vol. 10, No. 6, Nov. 1988, pp. 888–896.

Chng et al., "Reducing the Computational Requirement of the Orthogonal Least Squares Algorithn" Proceedings—ICASSP, IEEE International Conference on Acoustics, v. 3 1994, pp. III–529–III–532.

Chng et al., "Backtracking Orthogonal Least Squares Algorithm for Model Selection" IEE Colloquium (Digest) n 034 Feb. 10, 1994, pp 10/1–10/6.

DiGesu et al., "Features Selection and 'Possiblity Theory'", Pattern Recognition, vol. 19, No. 1, 1986, pp. 63–72.

Fukunaga et al., "Nonparametric Discriminant Analysis" IEEE Transactions on Pattern & Machine Intelligence, vol. PAMI-5, No. 6, 11/83, pp671–678.

Gu et al., "Application of a Multilayer Decision Tree in Computer Recognition of Chinese Characters", IEEE Transactions on Pattern Analysis & Machine Intelligence, vol. PAMI-5, No. 1, 1/83, pp83–89.

Hamamoto et al., "On a Theoretical Comparison Between the Orthonormal Discriminant Vector Method and Discriminant Analysis", Pattern Recognition, Vo. 26, No. 12, 1993, pp 1863–1867.

Ichino et al., "Optimin Feature Selection by Zero–One Integer Programming" IEEE Trans. on Systems, Man & Cybernetics, vol. SMC–14, No. 5, 1984, pp737–746.

Kubichek et al., "Statistical Modeling and Feature Selection for Seismic Pattern Recognitiion", Pattern Recognition, vol. 18, No. 6, 1985, pp441–448.

Kudo et al., Optimal Subclasses with Dichotomous Variables for Feature Selection and Discrimination:, IEEE Transactions on Systems, Man and Cybernetics, vol. 19, No. 5, Sep./Oct. 1989, pp1194–1199.

Kudo et al., "Feature Selection Based on the Structural Indices of Categories", Pattern Recognition, vol. 26, No. 6, 1993, pp. 891–901.

Liu et al., "Algebraic Feature Extraction for Image Recognition Based on an Optimal Discriminant Criterion", Pattern Recognition, vol. 26, No. 6, pp. 903–911, 1993.

* cited by examiner

AUTOMATIC METHOD FOR DEVELOPING CUSTOM ICR ENGINES

This invention was made with Government support under contract MDA-904-92-C-M300 awarded by the Department of Defense. The Government has certain rights in this invention.

BACKGROUND OF THE INVENTION

1. Field of the Invention

This invention relates to a computer automated method for creating image recognition engines optimized for a given language and/or source; and more particularly to a computationally efficient method for selecting, from a large universe of features, subsets of features that optimize recognition accuracy against a target data set. While not limited thereto, the invention will be explained in its preferred context for use in recognition of hand printed or machine printed characters.

2. Description of the Prior Art

As will be appreciated by those skilled in the art, each new language studied (and research in character recognition generally), proposes new character features to address specific problems or attributes of the source data set. However, the addition of new features is not necessarily sufficient for improved performance of a character recognition engine. If too many features are used, the rate of successful character discrimination actually drops as more features are added, a phenomena known in the art as peaking.

Each language (Japanese, Thai, English, et al.) has unique characteristics. Traditionally image character recognition (ICR) engines have been developed that make use of a feature set which was hand developed to support the language. The quality of the ICR is directly related to the amount of research effort applied to the language. High quality ICR engines exist where large markets support a large investment in research and development. An automated method that selects feature subsets would allow inexpensive development of ICR engines that perform well against languages that economically would not support a large investment.

Then, too, mixed languages can present unique problems as an OCR engine may need different features to distinguish between the two (or more) languages than the feature set used to best recognize either language individually. An automated feature selection tool would generate a feature set that is tailored to handle the particular mix of languages involved.

The following is a definition of certain of the terms used herein:

Class: All samples of a given codepoint (character) within the training data set.

Subclass: The set of samples within a single class which share some common attribute(s).

Codepoint: The representation to a machine of what people would recognize as a character.

Feature Vector: The set of measurements for the feature universe for a single sample ($\vec{v}$)

$S^+$: The class under consideration.

$S^-$: The set of all classes within the problem space other than the codepoint under consideration ($S^+$).

Exclusive: Used to describe a binary vector. Exclusive indicates that the binary vector is distinct from all vectors within $S^-$ (eq. 1).

$$\vec{v} \wedge \vec{S} \neq \vec{v} \ \forall \vec{S} \in S^- \quad (1)$$

where:

$\wedge$ is the "and" operator, $\forall$ is the "all" operator, and $\epsilon$ means exists.

G: A subset of $S^+$, also known as a "view"

$\alpha(G)$: The binary vector resulting from the logical conjunction of the samples represented by G.

$\Theta(S^+,S^-)$: The collection of all G subsets in $S^+$ such that $\alpha(G)$ is exclusive against all vectors in $S^-$.

$\Omega(S^+,S^-)$: The collection of all maximal subsets in $\Theta(S^+,S^-)$ where maximal is defined as every H in $\Theta(S^+,S^-)$ such that if $\alpha(H)$ is not exclusive against some $\alpha(G)$ in $\Theta(S^+, S^-)$ then H=G.

MAX: Number of samples within the largest subclass occurring in $\Omega(S^+,S^-)$ (eq. 2).

$$\mathrm{Max}(\Omega) = \max_{G \in \Omega} \frac{|G|}{|S^+|} \quad (2)$$

where: $|G|$ is the number of elements in set G.

AVE: The average number of samples within the subclasses occurring within $\Omega(S^+,S^-)$ (eq. 3).

$$Ave(\Omega) = \frac{1}{M} \sum_{G \in \Omega} \frac{|G|}{|S^+|} \text{ where } M = |\Omega| \quad (3)$$

SUMMARY OF THE INVENTION

An object of this invention is the provision of a computer automated method to select a subset of features in order to limit the number of features used by the character recognition engine, while optimizing its ability to discriminate among characters. That is, a method that narrows the number of features to those features that provide best within class consistency of recognition and the best cross-class discrimination.

Another object of the invention is the provision of a computer automated method of feature selection that is suitable for use with a large number of classes (i.e. 1000+ characters) and a large number of features (i.e. 100+ features).

A further object of this invention is the provision of a computer automated feature selection method in which the selection program is executed in a distributed operation on multiple processors.

Briefly, this invention contemplates the provision of a computer automated feature selection method based upon the evaluation of hyper-rectangles and the ability of these rectangles to discriminate between classes. The boundaries of the hyper-rectangles are established upon a binary feature space where each bit indicates the relationship of a real feature value to a boundary within the minimum and maximum values for the feature across all samples. Data reduction combines the binary vector spaces so that the number of samples within a single class is within a range which is computationally feasible. Identification of subclasses identifies maximal subsets of $S^+$ which are exclusive against $S^-$. Feature evaluation determines within a single subclass the contribution of each feature towards the ability to discriminate the subclass from $S^-$. The base algorithm examines each feature, dropping any feature which does not contribute towards discrimination. A pair of statistics are generated for each remaining feature. The statistics represent a measure of how many samples from the class are within the subclass and a measure of how important each feature is to discriminating the subclass from $S^-$. The values for each subclass are then combined to generate a set of values for the class. These class feature metrics are further merged into metrics evaluating the features contribution across the entire set of classes. Feature reduction determines which features contribute the least across the entire set of classes. These features will be removed from consideration. The algorithm drops features if they fail to reach a predetermined significance level. If all features are found to be significant then the feature with the lowest contribution metric is discarded. Finally, peaking determination is used to determine if the process should be repeated against the reduced feature space. The peaking determination is done by examining the rate of change within the significance metrics.

The basic algorithm is set forth in two articles by M. Kudo and M. Shimbo: "Feature Selection Based on the Structural Indices of Categories," *Pattern Recognition* 26 (1993) 891–901, and "Optimal Subclasses with Dichotomous Variables for Feature Selection and Discrimination," *IEEE Trans. Syst. Man Cybern.* 19 (1989) 1194–1199, which are incorporated herein by reference.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
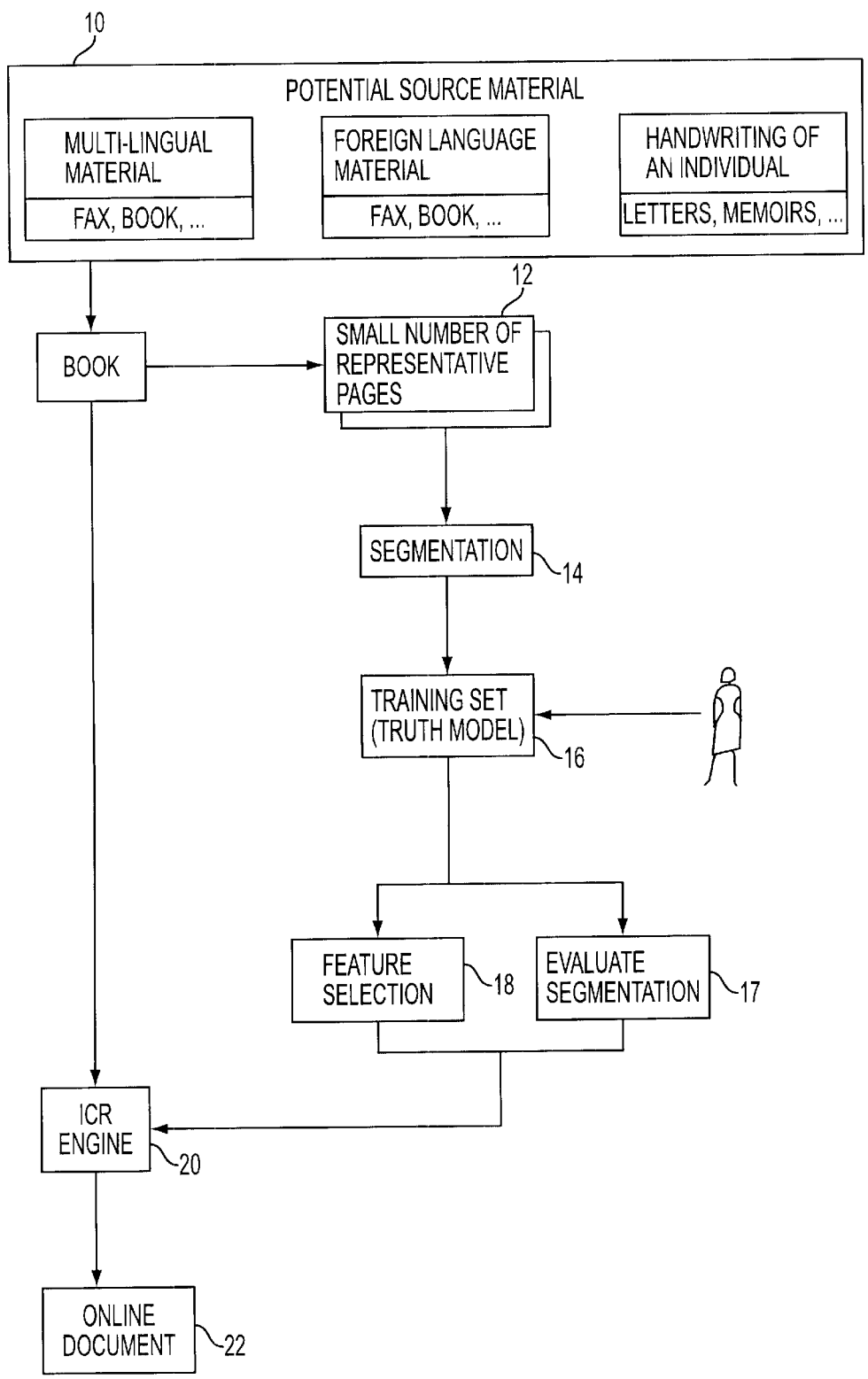
FIG. 1 is a diagram of a generalized procedure to provide custom generation of an image character recognition engine in accordance with the teachings of this invention.

Referring now to FIG. 1, with the feature selection algorithm of the invention and a suitable prior art ICR tool, it is now possible to develop and test ICR engines that are customized to a source data set such as indicated in the block 10, Potential Source Material. A small portion of the source data is selected as a training set in block 12. Using a suitable prior art base ICR tool, this training set is properly segmented and a truth model established for each of the characters, blocks 14 and 16.

The segmentation takes as input the document image and produces as output a list of character coordinates from the image. The literature contains many methods for doing segmentation, many of which would be suitable here. For example, the segmenter used in the preferred embodiment used image histograms to determine the lines and then clustered the connected components in a line, broken into strokes where needed, into the characters.

The resulting characters are then automatically clustered into groups which is an attempt to pull out the different characters. An expert shown in silhouette then corrects any segmentation errors and/or grouping errors and tags the characters with the desired codepoints, block 17.

As will be explained in more detail subsequently, at block 18, real feature vectors are generated for the feature universe under examination. The real feature vectors are converted to binary vectors as part of the feature selection algorithm. The feature selection algorithm then processes each class to determine the maximal exclusive subsets and the corresponding contribution metrics. The feature selection algorithm continues to reduce the feature universe until a peaking determination is made. Once the final feature set is established, an ICR template is generated that corresponds to the input training data.

Once the template is prepared, the remaining source data can be processed by the ICR engine 20 as an online document, block 22. This consists of reading the template library, segmenting the input data, and performing the recognition based upon the minimized distance measures.

The process may be repeated as often as necessary. Examination of alternative feature sets may be performed as new features are proposed by research efforts. The process would be repeated to generate new engines to support additional languages or data sources.

Figure 2:
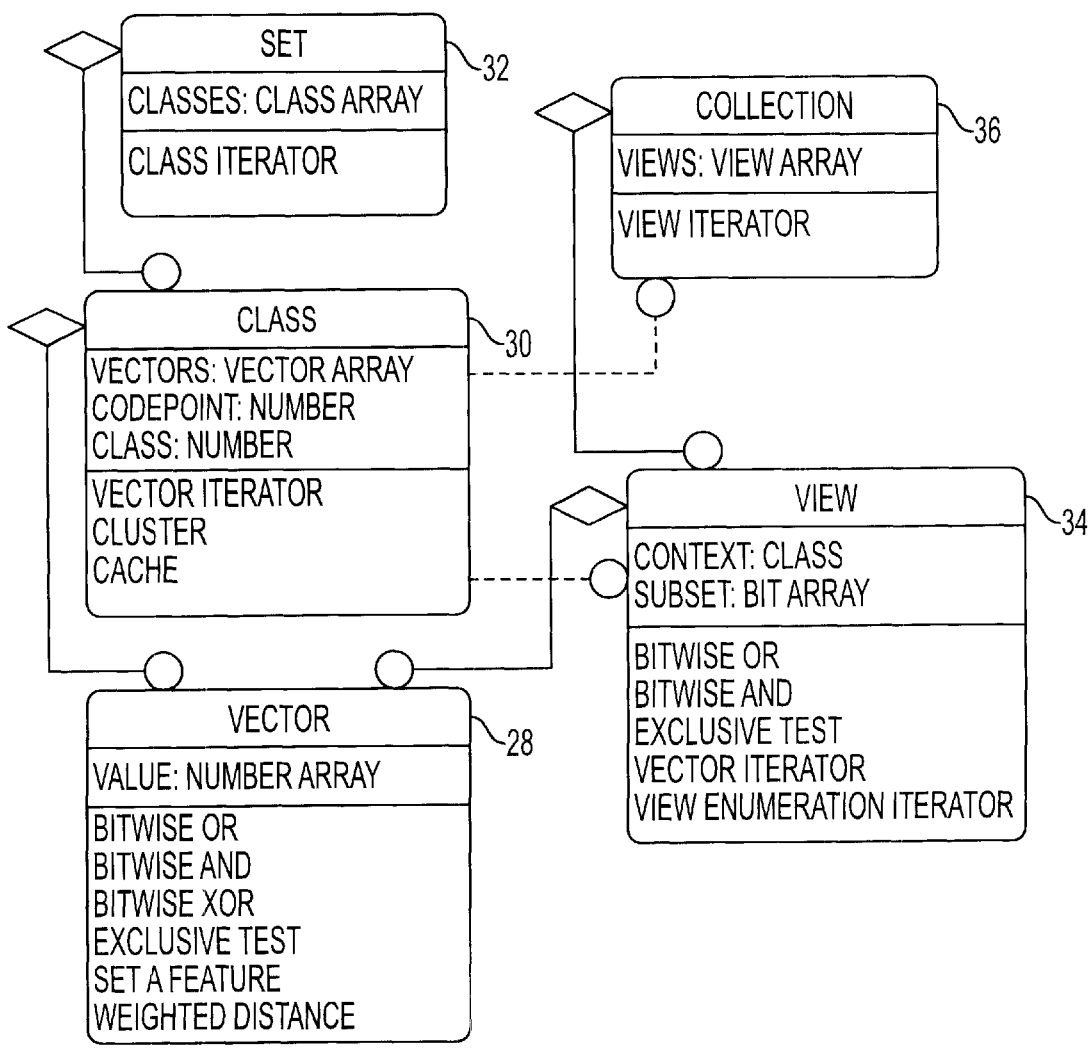
FIG. 2 is a diagram using object model notation to illustrate the feature vector subsets useful in the feature selection method in accordance with the invention.

Referring now to FIG. 2, it represents the data structure used in the automated feature selection process. The Figure uses Object Model Notation as described in the book by J. Rumbaugh et al. entitled *Object Oriented Modeling and Design*, 1991, Prentice Hall. The diamond shape symbol signifies "one" connected to the filled in circle which signifies "many." As seen in the figure, one set has many classes. The dotted lines indicate a conceptual relationship which is not necessarily required in the implementations. The fundamental unit of data is the binary feature "Vector" represented in block 28. Binary feature vectors are aggregated into a "Class" block 30, which represents a character, or one of several representations of a character (i.e. $S^+$). The classes are then aggregated into a "Set" (block 32) which contains the entire universe of training data. A "View" (block 34) is an aggregation of vectors within one class. And finally a "Collection" (block 36) is an aggregation of views, which all correspond to the same class. Each of these has a set of data attributes and functions used to operate on the data attributes.

Figure 3:
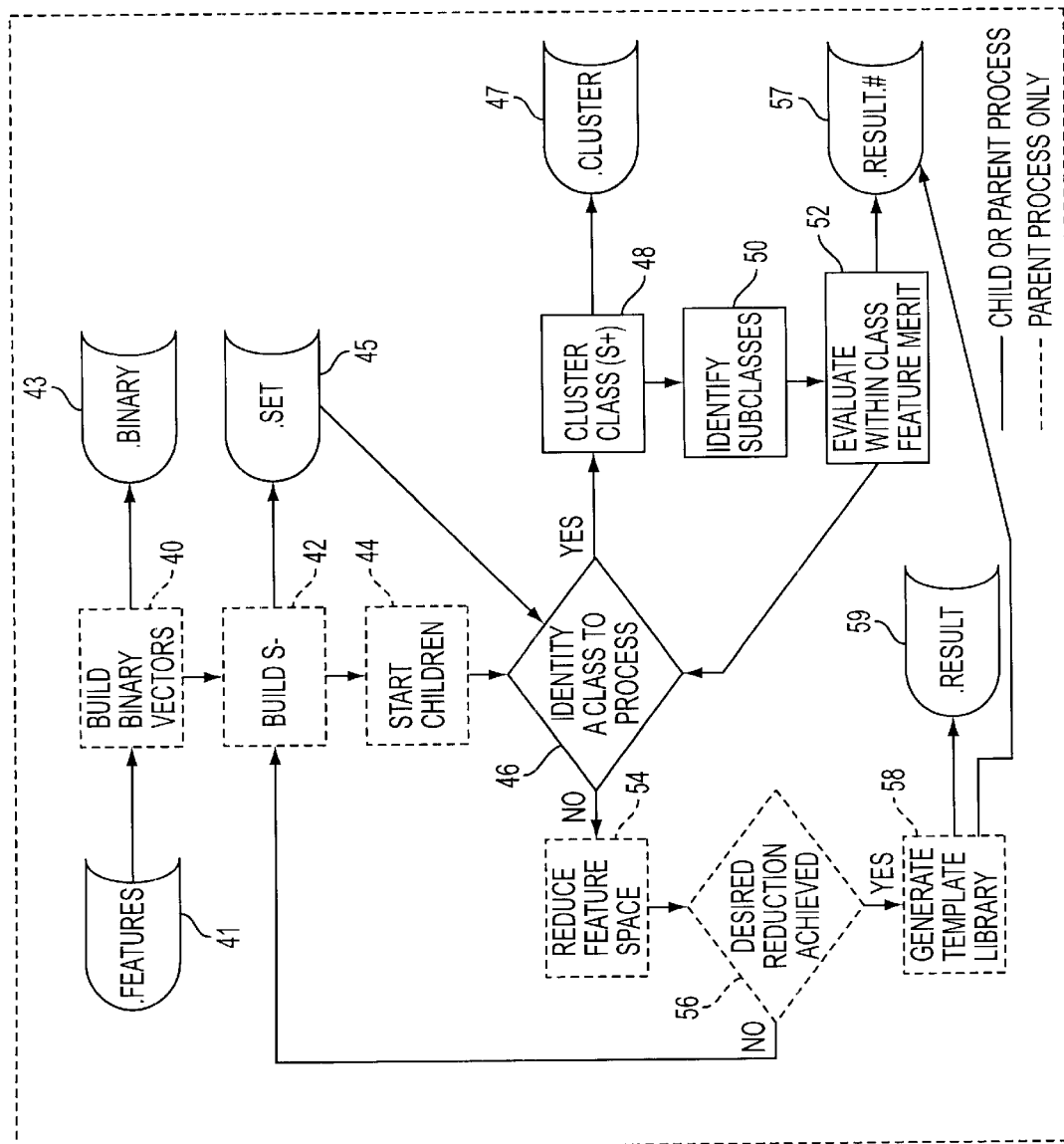
FIG. 3 is a block diagram of the distributed processing of feature vectors in the feature selection process of the invention.
Figure 3:
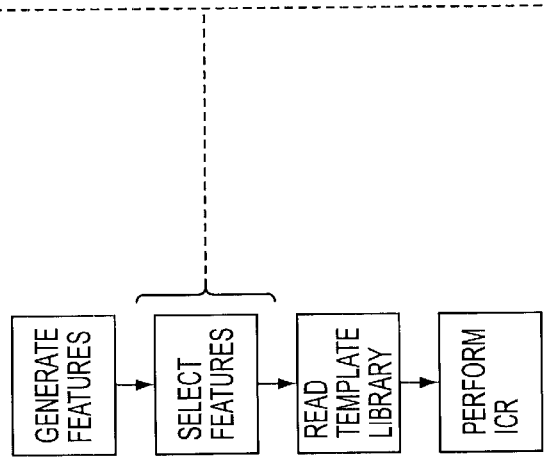

An implementation of the distributed, iterative feature evaluation tool is represented in FIG. 3. Within the select features activity, processing consists of three phases; data initialization, processing of classes, and result gathering. The processing architecture is designed to support the use of multiple processes against the same set of data as well as the ability to interrupt and restart processing.

Data initialization consists of three activities; "Build binary vectors" (block 40), "Build $S^-$" (block 42), and "Start children" (block 44). These activities are performed only by a parent process. The build binary vector step 40 consists of converting real feature vectors from a feature file 41 into binary feature vectors which are stored in a binary feature file 43. The resultant binary feature vectors contain feature values for the entire feature universe ($S^-$), which are stored in a set file 45. A mapping is maintained to identify the current feature set. As each class is binarized it is placed into the set, $S^-$. Since $S^-$ contains every class, during processing it is necessary to skip the codepoint of the class under consideration ($S^+$) when it is encountered within $S^-$. If the number of samples in a class is larger than a user specified parameter, the class is reduced to a desired number of samples. The reduction for S⁻ is based on Hamming distance and logical disjunction. The parent then initiates child processes (block 44) for processing individual classes. The use of children and the number to use can be selected by the user.

In decision block 46, the parent and children processes select classes for processing until each class has been processed using the current feature set (S⁻). After selecting the class to be processed as S⁺ (block 48 with clusters stored in cluster file 47), the process determines if reduction in sample size is required. Reduction is recommended if more than 32 samples exist in a class (i.e. 32 samples allows a view to be manipulated using integer operations). The exact limit can be specified by the user. Once the class has been prepared for use as S⁺, maximal exclusive subsets are identified using a non-recursive version of the base algorithm described in the Kudo et al. articles in place of the recursive version described in the articles, block 50. For each of these maximal exclusive subsets, it is evaluated against the current feature set based upon the subset's ability to discriminate against S⁻, block 52. The binary vector which represents the view has all redundant features cleared. The view, the resulting vector from the view, and the feature evaluations are stored to memory.

Once each class has been processed against S⁻, the parent process combines the metrics for each class so that a single metric is available that describes the contribution of each feature in the current feature set, block 52. Those features which do not contribute significantly (as configured by the user) are discarded, block 54. If all the features are significant, those that contribute the least will be removed. The user can configure a desired rate of feature removal. The structure indices are then tested to see if the feature evaluation process should terminate, block 56. Once the final feature removal has occurred, the last set from result files 57 and 59 combine in generating the template library, block 58.

Figure 4:
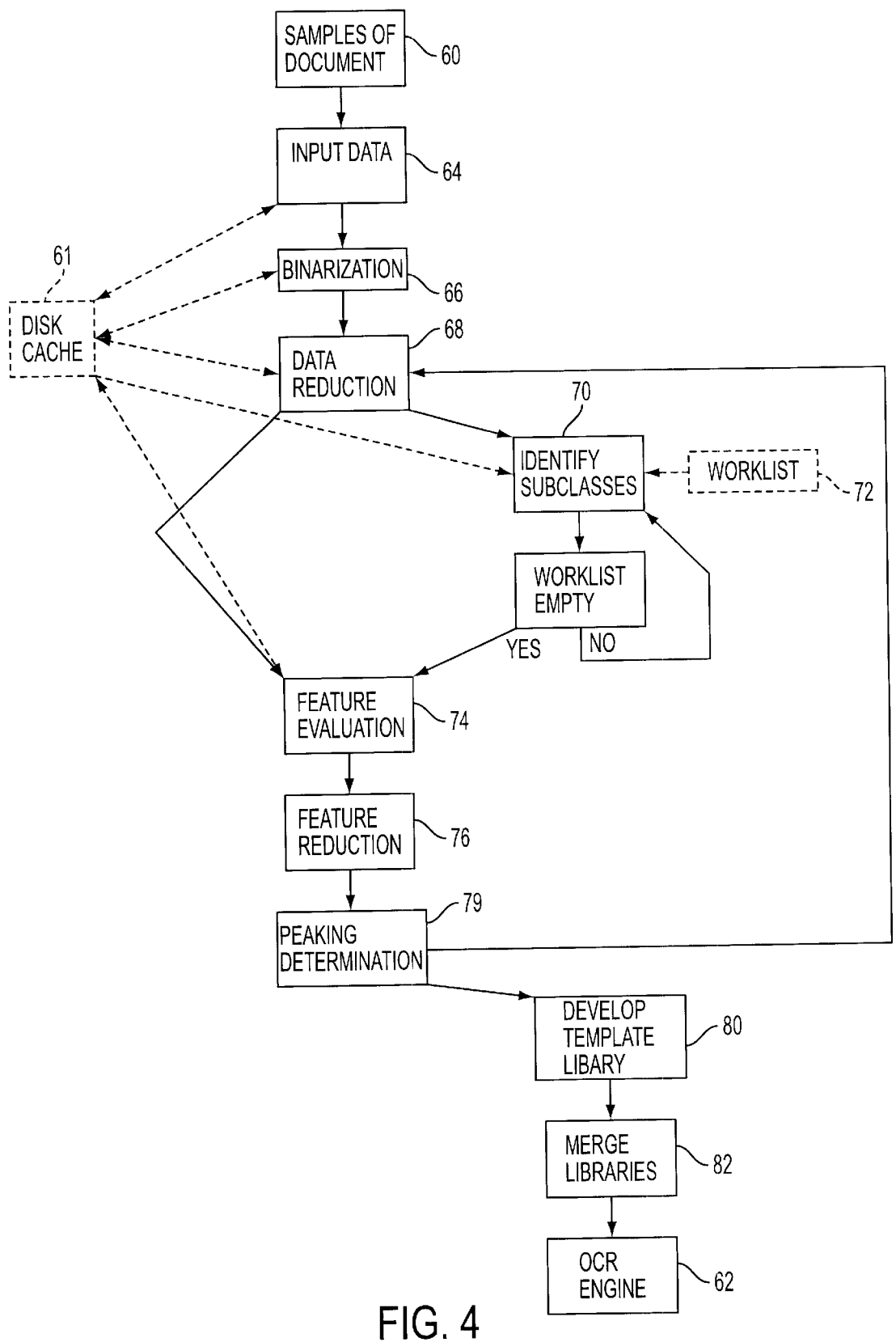
FIG. 4 is a flow diagram of one embodiment of the method steps for feature selection in accordance with the invention.

Referring now to FIG. 4, it shows how, in accordance with the teachings of this invention, the automated process for feature selection is incorporated into an automated method of creating an OCR engine for a given language and/or source. An optional disk cache 61 is used as a temporary storage in those hardware implementations where adequate common memory is not available. It starts with document samples (block 60) and ends with an OCR engine 62 optimized for the sample source. As previously explained, the sample data features are inputted, block 64, and binarized, block 66. Binarization converts real feature vectors to binary feature vectors. To efficiently use the bit space allotted to the binary vector, thresholds are defined; e.g. (P+2), P is defined in the article by M. Kudo and M. Shimbo entitled "Feature Selection Based on the Structural Indices of Categories," Pattern Recognition 26 (1993), page 893, column 2, and the real sample vector is transformed based on its position relative to the thresholds.

A data reduction step 68 includes the Identify Subclass step of FIG. 3. The activity "Identify Subclass," block 70, requires the greatest amount of CPU time. The base algorithm for finding subclasses described in the M. Kudo and M. Shimbo article entitled "Optimal Subclasses with Dichotomous Variables for Feature Selection and Discrimination," IEEE Trans. Syst. Man Cybern., 19 (1989) pp. 1194–1199, performs at least one iteration through the recursive procedure ENUMSAT. The class S⁺ may not contain any subclasses. Predetermination of the existence of subclasses within S⁺ can completely remove the "Identify Subclass" activity. The existence of subclasses is easy to detect. If a vector generated from the view consisting of each sample in S⁺ is exclusive against S⁻, then each sample is exclusive against S⁻. In this case a single view consisting of each sample will be the only entry within the collection $\Omega(S^+, S^-)$.

To reduce the total number of iterations required, once a subclass divides, each resulting portion needs to be examined to determine if it is sufficient or if further subdivision is required. The same subdivision may be identified many times upon examination of the divisions. This duplication is redundant and in a large problem space requires significant processing time. To address this issue, an iterative algorithm is used in accordance with the teaching of this invention. A work list 72 is maintained that corresponds to the original recursive call. Redundant entries are not placed onto the worklist. This reduces significantly the number of traversals of S⁻ required to determine if subsets were exclusive.

The loop within the flow diagram (FIG. 3) from the activity "Build S⁻" through the decision "Desired Reduction Achieved" reduces the feature universe, block 74. The base algorithm drops features from the universe using two rules. First, features are removed if the feature contribution does not exceed a configurable threshold, block 76. Then, if no features were dropped in the first step a single feature is selected for removal. At block 79, a peaking determination is used to determine if the process should be used against the reduced feature space. This peaking determination can be accomplished by examining the rate of change within the significant metrics.

The results from the feature selection mechanism are used to generate a template library, block 80. As described in "Feature Selection Based on the Structural Indices of Categories", page 896:

c=a Class

Sc⁺=S⁺ for class c

|Sc⁺|=number of sample vectors in Sc⁺

Sc⁻=S⁻ for class c

|Sc⁻|=number of sample vectors in Sc⁻

G=a view in $\Omega(Sc^+, Sc^-)$

|G|=number of sample vectors in G $\alpha(G,I)=\alpha(G)$ with the ith feature zeroed out (conceptually this removes both sides of the hyper-rectangle for that feature's dimension)

C⁻($\alpha(G,i)$)=the subset of vectors in $\alpha(G,i)$ exclusive against Sc⁻

|C⁻($\alpha(G,i)$)|=number of sample vectors in C⁻($\alpha(G,i)$)

$$p^+(G,c) = |G|/|Sc^+| \qquad (4)$$

Conceptually eq. 4 is the degree of contribution of G to Sc⁺

$$p^-(G,i,c) = |C^-(\alpha(G,i))|/|Sc^-| \qquad (5)$$

Conceptually eq. 5 is the degree to which feature I is important in order to make G be exclusive against Sc⁻.

Now the contribution metric for a feature I for class c is the summation across all G in $\Omega(Sc^+, Sc^-)$ of $[p^+(G,c)*p^-(G,i,c)]$.

The contribution metric for a feature across the entire Set (all classes) is the summation of all contribution metrics for a feature across all classes.

Note however that features are left zeroed out if the contribution metric for the feature is zero (i.e. |C⁻($\alpha(G,i)$)| is zero). This implies that feature confidence metrics are dependent on previous iterations. Using one pass through the features for one G would tend to favor the features looked at last. In the present invention to avoid favoring the features looked at last, the following steps are followed:

1) Calculate the contribution metrics as before.

2) Sort the features from the largest contribution to least.

3) Reset all of the features to their original values.

4) Pass through the features as before using the new order.

5) Repeat, starting at step 2, unless one of the following conditions are met:
   a) A maximum number of iterations allowed is exceeded (on the order of 5).
   b) No new features are added to the set of good features.
   c) The contribution metrics remain substantially unchanged as the evaluation order changes.

Contribution metrics will change when evaluated in a different order. When no significant change occurs as indicated in condition c above it is an indication that the process can stop. The template library 80 is then used by the recognition engine to process source samples.

The parallel implementation is not graphically represented here. Basically, the steps between and including data reduction and feature evaluation can be done independently for each $S^+$ and the resulting template libraries merged in step 82.

Given the feature selection algorithm and a base ICR tool, it is now possible to develop and test ICR engines that are customized to the source data set. A small portion of the source data is selected as the training set. Using the base ICR tool this training set is properly segmented and a truth model established for each of the characters. Real feature vectors are generated for the feature universe under examination.

The real feature vectors are converted to binary vectors within the feature selection algorithm. The feature selection algorithm then processes each class to determine the maximal exclusive subsets and the corresponding contribution metrics. The feature selection algorithm continues to reduce the feature universe until a peaking determination is made. Once the final feature set is established, the ICR template is generated that corresponds to the input training data.

Once the template is prepared, the remaining source data can be processed by the ICR engine. This consists of reading the template library, segmenting the input data, and performing the recognition based upon the minimized distance measures.

The process may be repeated as often as necessary. Examination of alternative feature sets may be performed as new features are proposed by research efforts. The process would be repeated to generate new engines to support additional languages or data sources.

The results from the feature selection mechanism are used to generate a template library as set forth in the I. Bella and G. Macey paper "Feature Selection Given Large Numbers of Classes and a Large Feature Universe" Proceeding 1995 Symposium on Document Image Understanding Technology, October 24–25, pp 202–212. The paper is hereby incorporated by reference. This template library is then used by the recognition engine to process source samples. The data contained within the results and the comparison process is provided for completeness.

The feature extraction algorithm produces the following data:

Thresholds (Bucket Ranges): The information required to convert from a real feature value to the binary representation.

Feature Map: Identification of the features that comprise the final selected feature set.

Class Data: there are multiple data elements generated for each class. The complete set is: the codepoint of the class, the binary vectors and the related confidence values representing the maximal exclusive subsets ($\Omega(S^+,S^-)$) within the class, and a final set of confidence values for the class as a whole. The class wide confidence values are aggregations of the confidence values for each subset.

Final Confidence Values: A contribution metric for each feature in the result set. This metric is the aggregation of the class contribution metrics.

This set of data is used to recognize each character within the source materials.

The recognition of a source character is a three step process. The character image is converted into a binary feature vector using the thresholds. This binary vector is then compared against each of the template vectors generating a distance measure. Finally, the template which minimizes the distance measure is selected as the correct class for the source character.

The distance measured between a source binary vector (S) and template vector (T) each composed of N features is given by the two equations 6 and 7 below.

$$\vec{d}_i = (\vec{S}_i V \vec{T}_i) \wedge \vec{T}_i \qquad (6)$$

$$D = \vec{d} \times \vec{C} = \sum_1^N (\vec{C}_i * \vec{d}_i) \qquad (7)$$

Each bit in a binary vector represents a rule denoting whether the value for the examined feature is greater or less than a threshold or bucket edge. Each feature (i) produces a feature distance measure ($\vec{d}_i$) in equation 6 that represents how far the sample is from the edge of a template's valid range which is the interior of the hyper-rectangle. The final distance is the feature distance multiplied by the confidence value for that feature ($C_i$). The final distance function (D) may be used with any of the three different confidence vectors: subset, class, and set.

Figure 5:
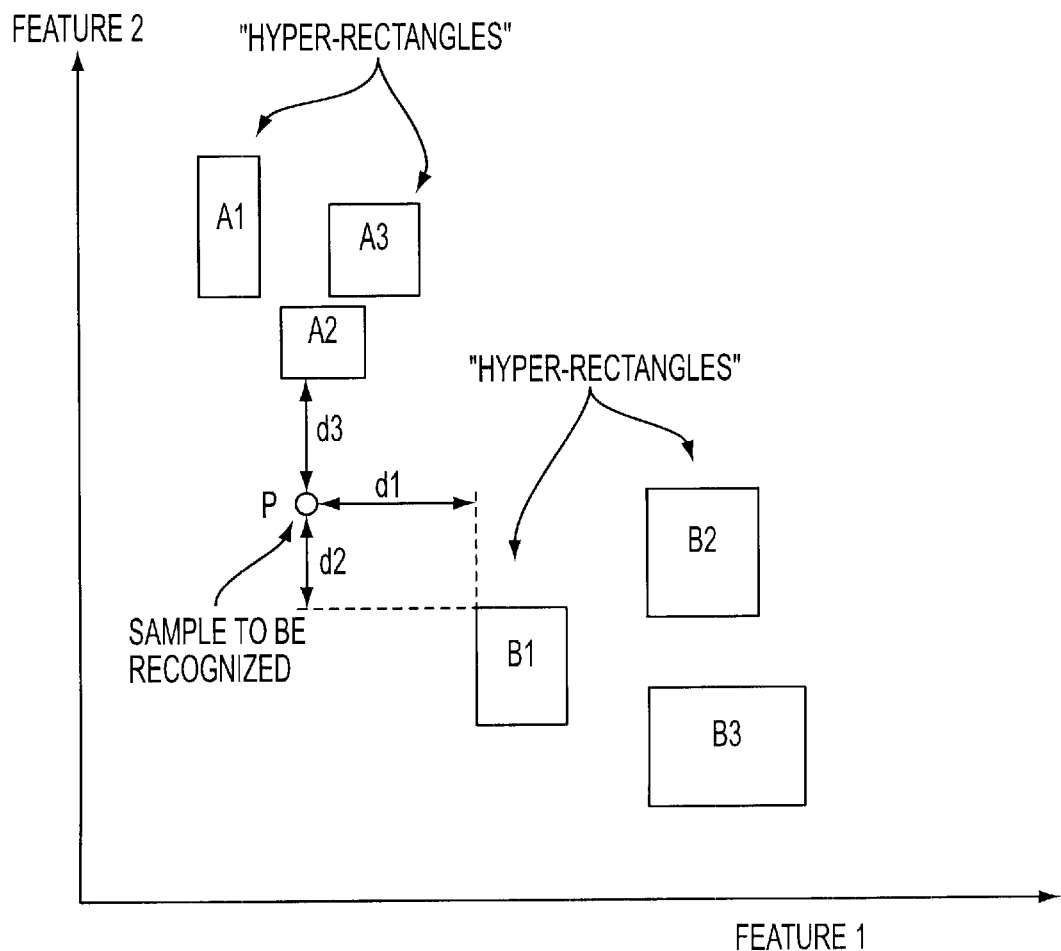
FIG. 5 is an example of determining the minimized distance measure in two-dimensional feature space in accordance with one aspect of the present invention.

An example in two-dimensional feature space is shown in FIG. 5. The distance from sample P (the sample to be recognized) to hyper-rectangle B1 is $d1*c1(B1)+d2*c2(B1)$ where c1(B1) is the contribution factor of Feature 1 for B1 and likewise for c2(B1). The same distance is calculated between the sample P and all hyper-rectangles. A K-nearest neighbor algorithm is used to decide which hyper-rectangle wins. For K=1, this is simply the hyper-rectangle with the smallest distance. In this example, with K=1, the hyper-rectangle A3 might win with a distance of $d3*c2(A2+0*c1(A2)$ and hence the sample P would be classified as an 'A'.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer automated method for machine recognition of character images in source material including the steps of:
   selecting a sample portion of said source material as a training set;
   segmenting said training set;
   grouping characters segmented in said segmenting step into classes;
   generating feature vectors for each of said classes;
   generating a feature set by processing each class to determine a maximal exclusive subset and a corresponding metric iteratively until a peaking determination is made, wherein said processing includes predetermining the existence of classes of said feature set by testing a vector generated from a view consisting of each sample in said feature set to determine if the vector is exclusive against said feature sets for all characters of said training set;
   generating an image character recognition template corresponding to said training set;
   processing on line said source material with character recognition template.

2. A computer automated method for machine recognition of character images in source material as in claim 1 including the further step of eliminating feature vectors that contribute less than a predetermined level of exclusivity of said feature set.

3. A computer automated method for machine recognition of character images in source material as in claim 1 wherein said generating step includes the further steps of maintaining a work list of subclasses and entering into said work list only subclasses not previously entered.

4. A computer automated method for creating an image recognition engine for a universe of characters comprising the steps of:

selecting samples from a universe of characters as a training set;

segmenting samples from the universe of characters;

determining a feature set for identifying each character in the samples;

evaluating features in said feature set to determine maximal subsets of said feature set that are exclusive of feature sets for all characters of said universe of characters, wherein said evaluating step includes a step of predetermining the existence of classes of said feature set by testing a vector generated from a view consisting of each sample in said feature set to determine if the vector is exclusive against said feature sets for all characters of said universe of characters;

determining the contribution metrics for each feature in each class for each set, wherein the classes are evaluated iteratively until a peaking determination is made;

eliminating features that contribute less than a predetermined level of exclusivity of said feature set; and developing a template library of feature sets for use in an optical character recognition engine.

5. A computer automated method for creating an image recognition engine for a universe of characters as in claim 4 further comprising the steps of maintaining a work list of subclasses and entering into said work list only subclasses not previously entered.

6. A computer automated method for creating an image recognition engine for a universe of characters as in claim 4 including the further step of converting real feature vectors to binary feature vectors by defining a series of threshold values with a binary value assigned to each threshold value, and assigning the binary value to each real feature value based on its threshold value.

7. A computer automated method for creating an image recognition engine for a universe of characters as in claim 4 wherein said steps of evaluating and eliminating are repeated until a desired reduction in the feature universe is achieved and wherein a percentage of features are eliminated each time said steps of evaluating and eliminating are repeated.

8. A computer automated method for creating an image recognition engine for a universe of characters as in claim 4 including the further step of converting real feature vectors to binary feature vectors by defining a series of threshold values with a binary value assigned to each threshold value, and assigning the binary value to each real feature value based on its threshold value.

9. A computer automated method for creating an image recognition engine for a universe of characters as in claim 5 including the further step of converting real feature vectors to binary feature vectors by defining a series of threshold values with a binary value assigned to each threshold value, and assigning the binary value to each real feature value based on its threshold value.

10. A computer automated method for creating an image recognition engine for a universe of characters as in claim 4 wherein said steps of evaluating and eliminating are repeated until a desired reduction in the feature universe is achieved.

11. A computer automated method for creating an image recognition engine for a universe of characters as in claim 5 wherein said steps of evaluating and eliminating are repeated until a desired reduction in the feature universe is achieved.

12. A computer automated method for creating an image recognition engine for a universe of characters as in claim 6 wherein said steps of evaluating and eliminating are repeated until a desired reduction in the feature universe is achieved.

13. A computer automated method for creating an image recognition engine for a universe of characters as in claim 10 wherein a certain percentage of features are eliminated each time said steps of evaluating and eliminating are repeated.

14. A computer automated method for creating an image recognition engine for a universe of characters as in claim 11 wherein a certain percentage of features are eliminated each time said steps of evaluating and eliminating are repeated.

15. A computer automated method for creating an image recognition engine for a universe of characters as in claim 12 wherein a certain percentage of features are eliminated each time said steps of evaluating and eliminating are repeated.

16. A computer automated method for creating an image recognition engine for a universe of characters as in claim 4 wherein said step of evaluating features is carried out in parallel in a plurality of processors for a plurality of feature sets for identifying each character.

17. A computer automated method for creating an image recognition engine for a universe of characters by selecting, from a large universe of features, subsets of features to optimize recognition accuracy, comprising the steps of:

segmenting samples from the universe of characters;

extracting feature sets for each character in the sample;

determining binary vectors for each character from the extracted feature sets;

evaluating features in said feature set to determine maximal subsets of said feature set that are exclusive of feature sets for all characters of said universe of characters, wherein said evaluating step includes a step of predetermining the existence of classes of said feature set by testing a vector generated from a view consisting of each sample in said feature set to determine if the vector is exclusive against said feature sets for all characters of said universe of characters;

determining the contribution metrics for each feature in each class for each set, wherein the classes are evaluated iteratively until a peaking determination is made;

eliminating features that contribute less than a predetermined level to exclusivity of said feature set; and developing a template library of feature sets for use in an optical character recognition engine.

18. The computer automated method of claim 4, further comprising the steps of:

determining binary vectors from the template library;

minimizing the distance measure between templates and the binary vectors by finding the distance between the binary vector, which is a point, and the closest template edge for each feature; and providing each character associated with the closest template or templates as performed by the K-Nearest Neighbor test.

* * * * *